Nov. 16, 1943.  H. ALLEN ET AL  2,334,303
MEANS FOR CLOSING AND LEAKAGE TESTING OF WELL EQUIPMENT
Filed March 17, 1941  4 Sheets-Sheet 1
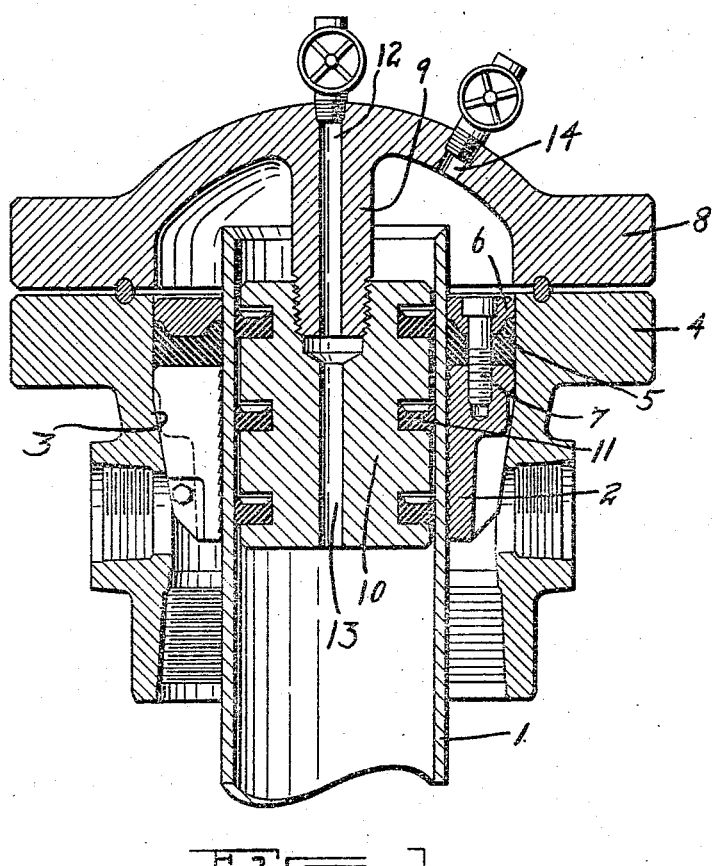
Ruric N. Bean.
Herbert Allen.
INVENTOR

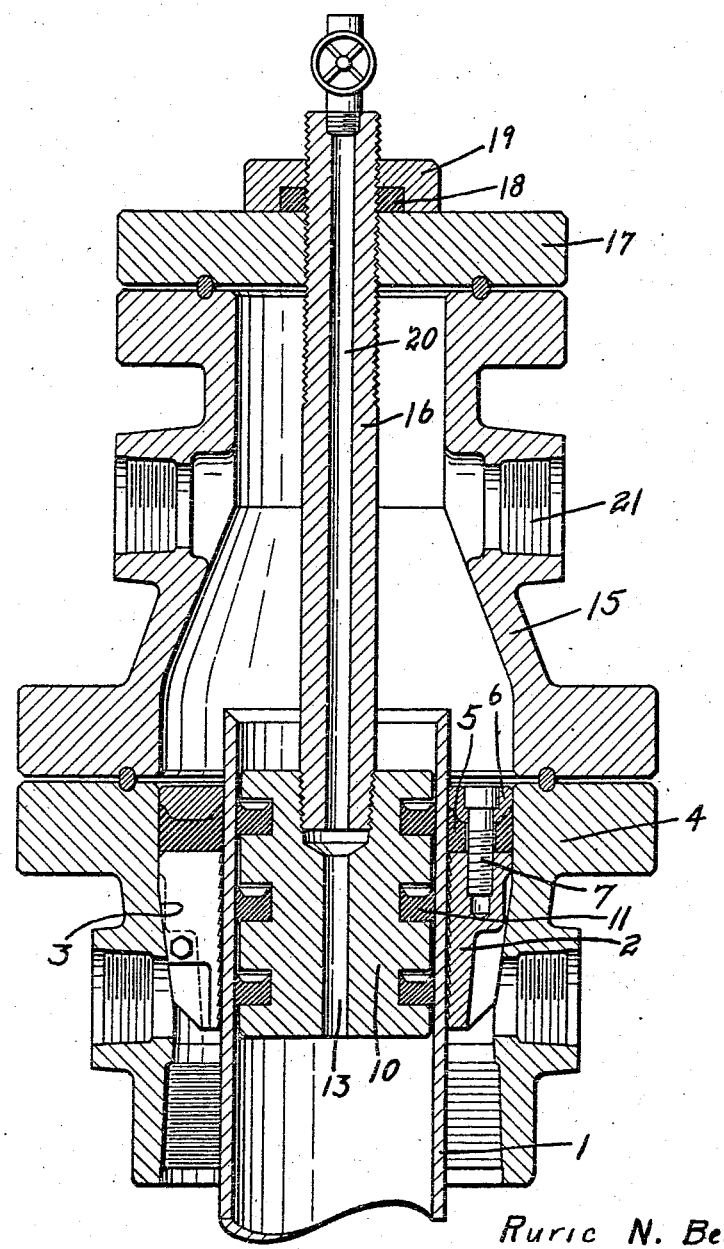

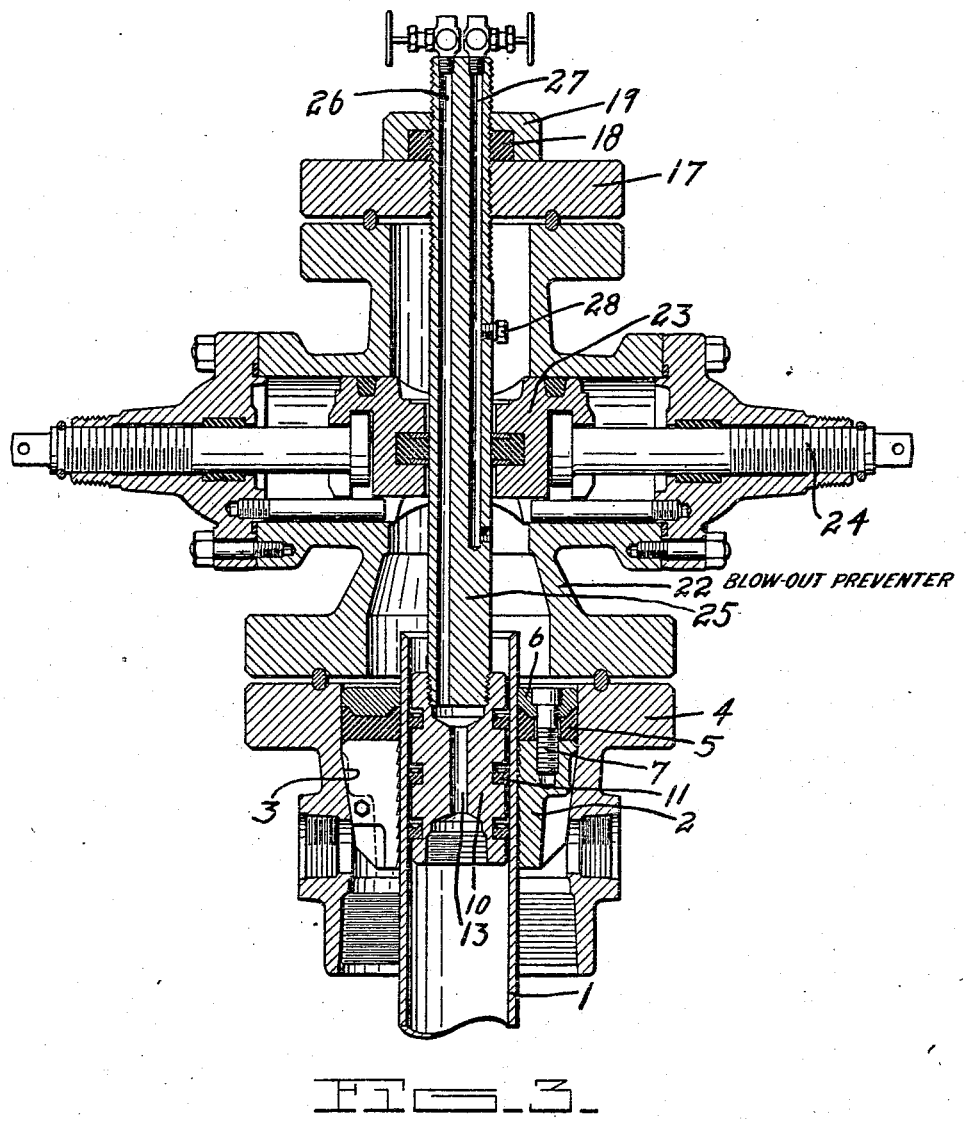

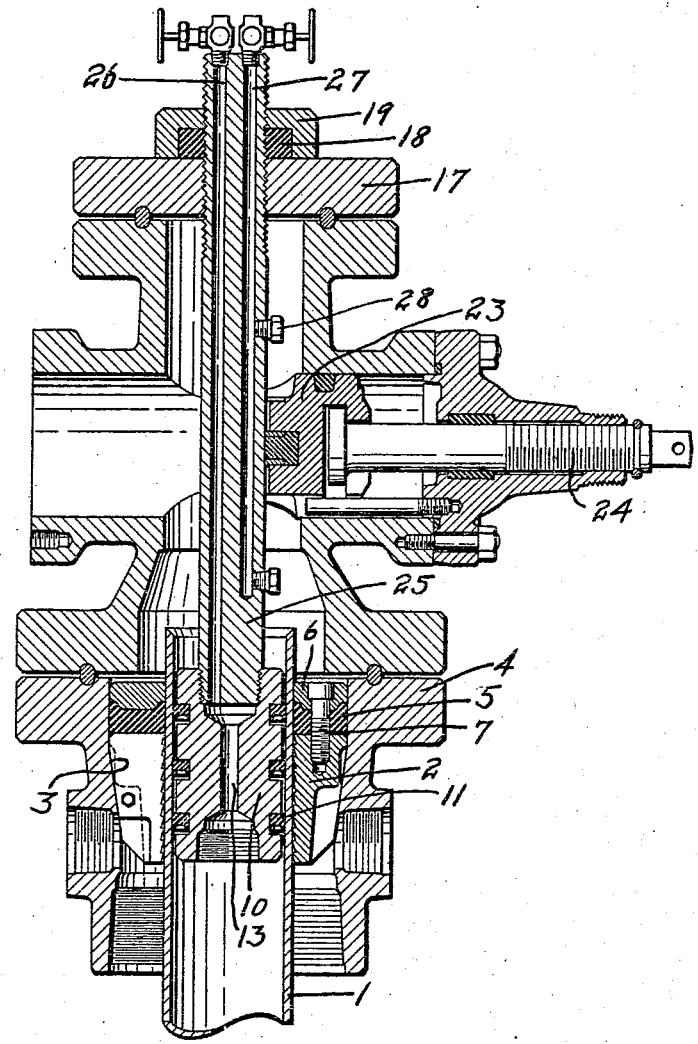

Patented Nov. 16, 1943

2,334,303

UNITED STATES PATENT OFFICE 2,334,303

MEANS FOR CLOSING AND LEAKAGE TESTING OF WELL EQUIPMENT

Herbert Allen and Ruric N. Bean, Houston, Tex., assignors to Cameron Iron Works, Houston, Tex., a corporation of Texas Application March 17, 1941, Serial No. 383,704

6 Claims. (Cl. 73—51)

This invention relates primarily to a means for testing the seal between the upper end of a well casing and a casing head in which it is hung and has for its general object the provision of such a means which will eliminate the necessity for the use of an extra flange or part between the casing head and the tubing head as a portion of the permanent equipment of the well.

Heretofore means have been devised for testing a seal within a casing head about a casing which involved the use of a flange placed on top of the casing head and forming an additional seal about the casing. This flange was formed with a passageway or duct leading from its outside edge into the space between the two seals so that fluid for testing the seals might be pumped in from the outside after the tubing head had been put into position, if desired. This flange in some cases was welded to the casing for the purpose of forming the seal between the flange and the casing and in other cases an expansible seal of some suitable type was employed. However, in every case the flange itself became a permanent part of the equipment on the well and inasmuch as it was an unnecessary part once the seal within the head had been tested, it represented in a certain sense a wasted investment and an extra piece of equipment not used after the first testing following its installation.

It is an object of this invention to provide a means for testing the seal between a casing and a casing head without the use of an additional part forming a permanent portion of the well equipment.

Another object of this invention is to provide a means of the character referred to which may be employed for the purpose of making a test either before or after a tubing head has been mounted on a casing head.

Another object of this invention is to provide a device for testing the tubing head and casing head equipment for a well and for testing the connections thereto, all at one set up and prior to running the tubing in the well.

Another object is to provide such a device which will serve also to close the upper end of the casing while a test is being made.

Another object of this invention is to provide such a device which may be utilized for the purpose of testing the seal formed by suitable blowout preventer elements carried on a tubing head which in turn is mounted on the casing head.

One other object of this invention is to provide a device of the character referred to which can also be used for the purpose of temporarily plugging the well while blow-out preventer rams are being changed or while some part of the well equipment is being worked on or replaced.

Other objects and advantages of this invention will become apparent from the following description taken in connection with the accompanying drawings wherein certain embodiments thereof are illustrated.

In the drawings:

Fig. 1 is a vertical cross section through a casing head and casing forming a part of well equipment, and illustrating in connection therewith a testing device constructed in accordance with this invention. In this instance, the testing device is of a nature intended for use on the casing head when no tubing head is in place thereon;

Fig. 2 is a view similar to Fig. 1 but showing a slightly modified form of testing device for use in connection with a well head equipment having a tubing head thereon;

Fig. 3 is a view likewise similar to Figs. 1 and 2 but showing a tubing head in the nature of a ram type blow-out preventer in place and forming a part of the well equipment;

Fig. 4 is a similar view illustrating the same apparatus shown in Fig. 3, the same in this instance being used for the purpose of temporarily plugging the well for the purpose of changing blow-out preventer rams.

Referring first to Fig. 1, the numeral 1 indicates the well casing which may be set in the usual manner and suspended by means of slips 2 within the tapered bowl portion 3 of the casing head 4. A seal is formed between the upper end of such casing and the interior of the casing head by means of a sealing ring 5 clamped into sealing position against the upper ends of the slips by means of a follower ring 6, and suitable bolts 7.

In the past, as above noted, it has been customary to provide a flange above the casing head where such equipment is used and to form an additional seal between the flange and the casing. Such flange was also provided with a duct or passageway leading from its exterior so that fluid under pressure could be injected into the space between the packing ring 5 and the seal within the flange. The packings could thus be tested.

The apparatus just referred to, however, was of such a nature that it was practically inexpedient if not impossible to remove the flanges after their use for testing purposes and it, therefore, became necessary to leave these flanges in place in the well as dead expense equipment which was never used after the well was first completed.

In accordance with the present invention, there is provided instead of the prior art flange fitting in the form of a testing bonnet 8, which is temporarily placed on top of the casing head and extends over the top of the casing and the casing head to close the same. This bonnet 8 has a downwardly extending projection 9 on its under surface and on the lower end of this projection 9 is a piston or plug 10 having sealing rings 11 disposed thereabout for the purpose of preventing leakage downwardly into the casing.

As will be seen, the bonnet 8 is provided with two openings thereinto, the first connecting with the passageway 12 which leads through a bore in the extension 9 and through another bore 13 in the piston 10. The purpose of this passageway is to permit fluid to escape from below the piston as it is being put into place in the upper end of the casing. The other passageway 14 is adapted to be connected to a source of testing fluid which may be injected into the bonnet to the desired pressure for the purpose of testing the seal formed by the sealing ring or packing 5. Both of the passageways 12 and 14 are controlled by suitable valves.

After the test of the packing 5 has been made, the bonnet 8 may be removed and the remainder of the well equipment put in place. It will be noted that during the testing operation the well casing will not be left entirely open as is the case where a flange is used as above described, but is closed by means of the piston 10 and the bonnet 8 so that the well cannot under any circumstances "kick" or blow-out during the time the test is being made.

It will be apparent that the testing bonnet and the piston assembly may be used again and again as many times as may be desired.

Referring to Fig. 2, the same equipment is illustrated and its use is the same except that in this instance a tubing head 15 has been put in place on the casing head, and the piston 10 instead of being supported from the extension 9 under the bonnet fitting 8 is supported from a similar member in the form of a nipple 16 threaded through a fitting in the form of the flange 17. This nipple 16 is provided with a long thread where it passes through the flange so that its position may be adjusted upwardly or downwardly to the height of the tubing head. The seal is formed around the nipple 16 where it passes through the flange 17 by means of a sealing ring 18 held in place by a lock nut 19. The nipple 16 has a passage 20 therethrough corresponding to the passage 12 shown in Fig. 1 and the testing fluid is adapted to be injected into the tubing head through one of the usual flow openings 21.

After the test has been made with this equipment, the piston 10, the nipple 16, and the flange 17 may be removed just as in the case of the bonnet shown in Fig. 1, and thereafter the remainder of the well equipment may be put into place. The function of the apparatus shown in Fig. 2 is in substance identical with that shown in Fig. 1 with the exception that it is slightly modified to accommodate a tubing head on top of a casing head. This modification, however, makes possible the additional function of simultaneously testing the tubing head and its connections.

Referring now to Fig. 3, the equipment shown is similar to that shown in Fig. 2 with the exception that instead of a plain tubing head, such as shown at 15 in Fig. 2, there is a ram type blow-out preventer 22 having therein rams 23 adapted to be moved by means of screws 24 or other appropriate devices so as to close about a tubing through which the well will be flowed. In this case instead of the nipple 16 there is employed a nipple or rod 25 having a passage 26 therethrough corresponding to the passage 20 in Fig. 2 and having an additional passage 27 extending from its upper end to a point below the blow-out preventer rams. Two lateral openings are provided into this second passageway 27, one or both of these being adapted to be closed by means of a plug or plugs 28. The flange 17, packing ring 18 and lock nut 19 correspond exactly to the elements bearing those numbers in Fig. 2.

In this form of the invention the apparatus will be assembled as illustrated in Fig. 3 whereupon testing fluid may be supplied either with the rams open or closed through the passageway 27. If the rams be open, the seal 5 within the casing head, the seal between the casing head and tubing head, and the tubing head connections will all be tested. If, however, it be desired to test the seal provided by the rams, this may be accomplished by leaving out either the lower or upper plug depending upon the position of the flow openings from the tubing head. If the flow openings from the tubing head be above the rams, as shown, then with the rams closed, the lower plug removed, and the upper plug in place, fluid under pressure will be injected through either the passageway 27 or one of the flow openings into the space below or above the rams, as the case may be. If the pressure fluid is injected through the passageway 27, one of the flow openings will be left open, and vice versa. Pressure will thus be applied to one side of the rams only and a test may be obtained on the seal provided by the rams against either upward or downward pressure, as desired.

If the flow openings from the tubing head be below the rams, then a plug will be put in the lower opening from the passageway 27 and the upper one of these openings will be left without a plug. In a similar manner a flow opening below the rams will be left open and pressure will be applied above or below the rams for the purpose of testing the seal provided by the rams.

It will be understood that due to the presence of the piston 10 during the various tests and in the various assemblies described, the well will not be left open and will not be free to "kick" or blow-out. Furthermore, as illustrated in Fig. 4, the piston may be inverted so as to provide a positive seal within the upper end of the casing which will not permit any flow whatever from the casing. In this instance the sealing rings will act to prevent flow from the casing 1 between the casing wall and the piston whereas in the preceding figures the sealing rings act to prevent flow from the casing head into the casing. With such a seal in place it is possible to effect replacement of parts, such as the blow-out preventer rams or carry out other repairs and replacements, which may be found desirable in the equipment above the casing head.

It will also be appreciated that by use of the structures shown in Figs. 2, 3 and 4 it is possible before running the tubing into a well to connect the tubing head and other parts of the Christmas tree through which the tubing can pass as it is being run into the well, and to test the connections to and between all of these parts simultaneously with the same set up, before the tubing is run. This equipment is thus tested in place on the well and by this test the operator may be certain that all connections are perfect before the well is brought in.

Having described our invention, we claim:

1. A device for testing the seal between a casing head and a well casing hung therein, comprising a fitting, means for forming a seal between said fitting and the upper end of the casing head throughout its circumference, and means for forming a seal between said fitting and the inner surface of said casing adjacent its upper end, said last mentioned means providing a passage from the interior of said casing to the exterior of said fitting, and means for injecting fluid under pressure into the space between said fitting and the seal between said casing head and casing.

2. A device for testing the seal between a casing head and a well casing hung therein when a tubular extension is mounted on the upper end of the casing head, and for simultaneously testing the connections to said tubular extension, comprising a fitting adapted to form a seal with and close the top of said tubular extension, said fitting having an arm extending downwardly therefrom through said tubular extension to a position adjacent the upper end of said casing, means suspended from said arm for closing the passage through said casing, said arm and said last mentioned means having a passage therethrough connecting the interior of said casing with the exterior of said fitting, and means for injecting fluid under pressure into the space between said fitting and the seal between said casing head and casing.

3. In a device for testing the seal between a casing head and casing when a tubular extension having blow-out preventer rams and a lateral opening therefrom is mounted on the casing head, and for also testing the sealing efficiency of said rams and the connections to said extension, comprising a fitting adapted to close the upper end of the tubular extension, an arm extending downwardly from said fitting through said tubular extension to a position adjacent the upper end of said casing, said arm being of an external size to receive said rams, said arm having a passage therein from the exterior of said fitting into the space on the opposite side of said rams from said lateral opening, means suspended from said arm for closing the passage through said casing, and said arm and last mentioned means having a passage connecting the interior of said casing with the exterior of said fitting.

4. In a device for testing the seal between a casing head and casing when a tubular extension having blow-out preventer rams and a lateral opening therefrom is mounted on the casing head, and for also testing the sealing efficiency of said rams and the connections to said extension, comprising a fitting adapted to close the upper end of the tubular extension, an arm extending downwardly from said fitting through said tubular extension to a position adjacent the upper end of said casing, said arm being of an external size to receive said rams, said arm having a passage therein from the exterior of said fitting opening into the spaces on the opposite sides of said rams, means for closing communication between said passage and the spaces on the respective sides of said rams independently of each other, means suspended from said arm for closing the passage through said casing, and said arm and said last mentioned means having a passage connecting the interior of said casing with the exterior of said fitting.

5. In a device for testing the seal between a casing head and casing when a tubular extension having blow-out preventer rams and a lateral opening therefrom is mounted on the casing head, and for also testing the sealing efficiency of said rams and the connections to said extension, comprising a fitting adapted to close the upper end of the tubular extension, an arm extending downwardly from said fitting through said tubular extension to a position adjacent the upper end of said casing, said arm being of an external size to receive said rams, said arm having a passage therein from the exterior of said fitting into the space on the opposite side of said rams from said lateral opening, and means suspended from said arm for closing the passage through said casing.

6. In a device for testing the seal between a casing head and casing when a tubular extension having blow-out preventer rams and a lateral opening therefrom is mounted on the casing head, and for also testing the sealing efficiency of said rams and the connections to said extension, comprising a fitting adapted to close the upper end of the tubular extension, an arm extending downwardly from said fitting through said tubular extension to a position adjacent the upper end of said casing, said arm being of an external size to receive said rams, said arm having a passage therein from the exterior of said fitting into the space on the opposite side of said rams from said lateral opening, means suspended from said arm for closing the passage through said casing, said last mentioned means being reversibly mounted on said arm and adapted when in one position to prevent down flow through said casing from the space within said tubular extension and in the other position to prevent upflow through said casing to the space within said tubular extension.

HERBERT ALLEN.
RURIC N. BEAN.